3,256,314
CONTINUOUS METHOD FOR THE PRODUCTION OF N-METHYLENEGLYCINONITRILE
Frederick S. Dovell, Naugatuck, and Joseph A. Puma, Waterbury, Conn., assignors to United States Rubber Company, New York, N.Y., a corporation of New Jersey
Filed May 29, 1963, Ser. No. 284,075
8 Claims. (Cl. 260—465.5)

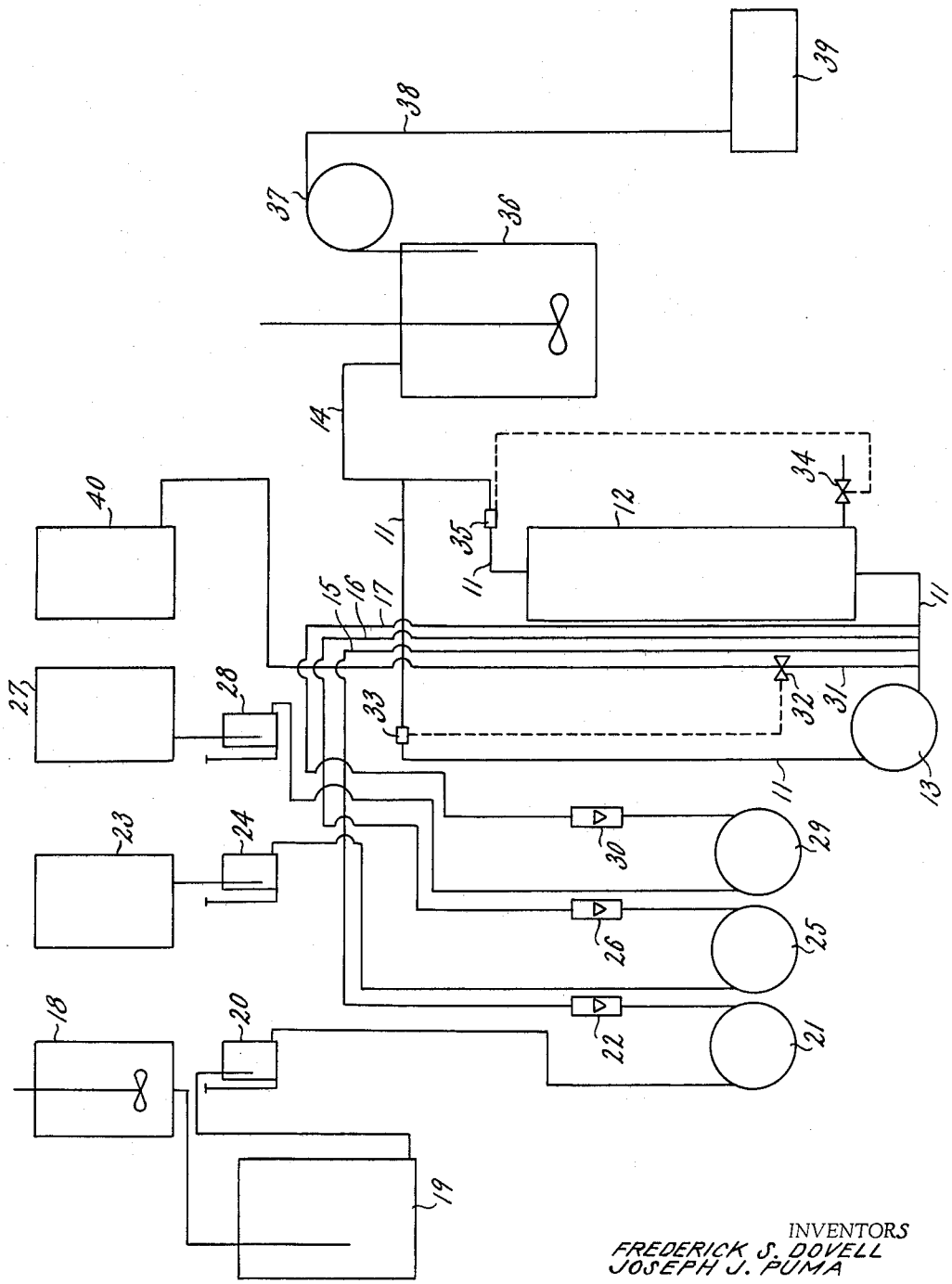

This invention relates to an improved process for the manufacture of N-methyleneglycinonitrile. More specifically, this invention relates to a continuous process for the manufacture of this chemical in which the reactants, ammonia, hydrogen cyanide and formaldehyde, are used in relatively dilute aqueous solutions and the reaction is conducted at temperatures up to 60° C.

The compound, N-methyleneglycinonitrile, was first described by Jay and Curtius, Berichte 27, 59 (1894). This and all subsequent references describe batch processes for manufacturing this compound, which processes call for the use of salts of ammonia (ammonium chloride, sulfate, acetate, etc.) and alkali metal salts of hydrogen cyanide (potassium or sodium cyanide) in the reaction with aqueous formaldehyde at low temperatures ranging from −20° to +20° C. One is warned that the use of higher temperatures produces unfortunate results. Thus, Curtius and Welde, Berichte 43, 868 (1910), urge that the reaction temperature be maintained below 10° C. or the product would become sticky and the yield would be unfavorably influenced. According to Johnson and Rinehart, J.A.C.S. 46, 768 (1924), if the reaction temperature is allowed to rise above 13° C. during the addition of the cyanide solution, "the reaction product tends to separate in a plastic form which is extremely difficult to purify." Amundsen and Velitzkin, J.A.C.S. 61, 212 (1939) state that, if the reaction temperature is maintained at 35°–40° C., "an oily product was formed." Adams and Langley, Organic Syntheses, Coll. Vol. I, 355 (2nd ed.), confirm the latter statement by reporting that, if the reaction temperature goes higher than 5° C., "a heavy oil is sometimes obtained." The patent literature indicates the same problem with the use of reaction temperatures above room temperature. Thus, U.S. Patent No. 2,823,222, at col. 2, lines 34–38, indicates that, at reaction temperatures in excess of 10° C., the reaction product "may be formed as an oleaginous substance which is difficult to recover."

It is an object of this invention to provide a continuous process for the production of N-methyleneglycinonitrile which is characterized by the production of this compound in high yields.

It is a further object to attain this desirable result by the use of the most inexpensive sources of ammonium and cyanide ions, namely, ammonia and hydrogen cyanide.

It is an additional object of this invention to utilize reaction temperatures of 20° C. and higher and to thereby eliminate the expensive cooling requirements of the prior art.

Other objects of the invention will be apparent from the description thereof which follows.

In general, the continuous process of this invention for the manufacture of N-methyleneglycinonitrile affords significant economic advantages in the form of low raw material costs, low processing costs and high yields. The raw materials can desirably be anhydrous hydrogen cyanide, anhydrous ammonia and formaldehyde, these materials being used as aqueous solutuions for ease of handling. These solutions are metered into the reaction zone concurrently and in fixed ratios, being mixed thoroughly in that zone. A desirable feature of this invention is the back mixing of the reaction mass with fresh feed. The reaction mass is kept slightly acidic, suitable acidifying agents including inexpensive mineral acids. Cooling is provided to maintain the reaction mass at the desired temperature. The discharge rate from the reaction zone is substantially equal to the total feed rate. The product is then continuously separated, washed, dried and packaged. Thus, the method of this invention can be completely continuous from solution make-up to final packaging. The advantages over a batch process are that there is less down time, easier operation through the use of automatic control instrumentation and a high volume of production from relatively small equipment. The method of this invention actually gives yields in the 93–96% range (under optimum operating conditions), whereas the best previously reported yield was 84.5%.

Unlike the prior art processes, very little salt is formed in the method of this invention since the by-product from the ammonia and cyanide sources is water. This gives a product which is easy to wash and eliminates some of the previously encountered solublility losses. The prior art problems on this score were due to the excessive washing required for removing the salts which were present and were also due to the fact that the prior art products were obtained as fines rather than as the coagulated product of this invention.

The figure illustrates one desirable form of apparatus for carying out the process of this invention. However, this figure is merely illustrative, as any form of apparatus, which provides the desired mixing, agitation, residence time and temperature control features, can be used instead of the depicted equipment. For example, a suitable alternative apparatus is a glass-lined reaction vessel with horizontal side baffles, a three-pronged agitator and cooling coils. Or, the form of apparatus illustrated in the figure can be used with the omission of the second stage holding vessel and, if desired, the inclusion of a reaction vessel as part of the recirculation loop.

In the figure, piping 11 together with heat exchanger 12 and pump 13 form a recirculation loop in which the bulk of the reaction to form N-methyleneglycinonitrile occurs. The exit from this loop is via piping 14. Each of the relatively dilute reactants is charged through a separate one of the feed inlets 15, 16 and 17. The aqueous hydrogen cyanide solution is prepared by miixng anhydrous hydrogen cyanide and water in glass-lined vessel 18. The resulting solution is stored in glass-lined tank 19, from which it is charged at a desired rate to piping 11 via a stainless steel drum 20 on a weigh scale (not shown) by means of pump 21 and feed inlet 15, the rate being checked by pre-calibrated rotameter 22. Similarly, the ammonium hydroxide solution is prepared in stainless steel tank 23, from which the solution proceeds to piping 11 via stainless steel drum 24 on a weigh scale (not shown), pump 25, rotameter 26 and feed inlet 16. The aqueous formaldehyde solution is prepared in glass-lined tank 27, and likewise is charged to piping 11 via stainless steel drum 28 on a weight scale (not shown), pump 29, rotameter 30 and feed inlet 17. The acid used for pH control is charged from tank 40 to piping 11 through feed inlet 31, the acid feed valve 32 being controlled automatically through controller 33 which is connected to pH probes (not shown) inserted into the reaction mass passing through piping 11.

Recirculating pump 13 provides the initial mixing of the freshly charged reactants with the recirculating reaction mass, and also effects the rapid recirculation of the reaction mass in the indicated loop. The amount of cooling water charged to heat exchanger 12 via valve 34 is automatically controlled by thermocouple 35. A mass flowmeter (not shown) is desirably included in the recirculation loop so as to enable a determination of the recirculation rate.

Piping 11 can suitably be stainless steel which is, e.g., 3 inches in diameter. The piping can be constructed of other materials which are not affected by the components of the reaction mass. Heat exchanger 12 can suitably be of the shell and tube type, excellent results having been obtained with such an exchanger containing 22 1-inch outer diameter stainless steel tubes. The relatively constricted size of the tubes in the heat exchanger is productive of vigorous agitation. Excellent results are attained by using the recirculation loop equipment of the figure in which, for example, the total charge to the system is at a rate of about 1 gallon per minute, the recirculating loop has a capacity of about 30 gallons, the discharge rate of the recirculating pump is about 385 gallons per minute and complete recirculation is effected about 13 times per minute. In the foregoing equipment, the minimum velocity through the 1-inch outer diameter heat exchanger tubes is about 15 feet per second in order to create the desired turbulence in the reaction mass. At slower rates, there is a solids build-up on the passage walls, apparently caused by undesired by-product formation due to ineffective mixing and the resultant local overheating and presence of reactants in amounts outside of the prescribed ranges.

Piping 14 acts as the discharge line from the recirculating loop and also is desirably constructed of stainless steel with a diameter approximating that of piping 11. The discharge rate through piping 14 is equal to the total feed rate of the reactant and acid solutions. The slurry being discharged from the recirculating loop via piping 14 flows into agitated vessel 36. When the recirculating loop has a capacity as indicated above, vessel 36 suitably has a 75 gallon capacity and is preferably a glass lined vessel. The use of vessel 36 permits the reaction mass to attain the desired residence time and also enables the formation of relatively large crystals of the desired reaction product. Essentially no heat is evolved at this stage. The discharge of the slurry from vessel 36 is effected by means of pump 37 through tubing 38. The discharge is to any filtration unit 39, which can suitably be a horizontal rotary filter, a rotary drum filter or any type of batch filter. The solid reaction product is water-washed on the filter. After the filtration step, the separated solid product is sent to a drier (not shown), which can suitably be a vibrating screen drier, a down-draft drier or a rotary drum drier maintained at a temperature in the range of from about 70° to about 120° C.

The reactants are charged as relatively dilute, aqueous solutions to the reaction zone. The solutions should contain from about 70 to about 85% by weight of water, although some variation outside of this range is permitted as long as the combined reactant charge (a theoretical concept since the reactants are preferably charged separately to the reaction zone) has a concentration in the indicated range. Best results are attained in the process of this invention if, for every mole of hydrogen cyanide, from about 1 to about 2 moles of ammonia and from about 1.8 to about 3.5 moles of formaldehyde are charged to the reaction zone.

The reaction temperature should be maintained in the range from about 10° to about 60° C., a more preferred range being from about 25° to about 45° C. When operating in the latter range, expensive refrigeration techniques are avoided since the use of unrefrigerated cooling water is sufficient to control the exothermic reaction.

The pH of the reaction mass should be maintained at a level of not more than 7.0. At higher pH levels, the desired reaction product is not obtained. The preferred pH range is from about 5.0 to about 6.8. As the pH is lowered below 5.0, the desired reaction product is obtained but hydrolysis difficulties are encountered so that the yield of the desired product is cut down. The acid used for controlling the pH is not critical. The strong mineral acids, e.g., sulfuric, phosphoric, nitric, and hydrochloric acids, are preferred since they are inexpensive and give quite satisfactory results. However, any acid having a dissociation constant ($K_a$) of $10^{-5}$ or higher is suitable as long as it does not decompose or otherwise react under the reaction conditions. Thus, acetic acid and other organic acids having the mentioned characteristics can quite suitably be used in the method of this invention.

It has been found that the best yields are attained when the average residence time in the reaction zone is from about 60 to about 150 minutes. Such residence times can be attained by the use of equipment as described in connection with the figure or in any equivalent equipment which also provides for the essential thorough mixing and agitation. When the reaction temperature is lowered below 10° C., the necessary residence times increase beyond practical limits and it is not economically feasible to utilize a continuous process in the face of such long residence time requirements.

It is considered that the correct combination of all of the variables referred to above is essential to obtain the improved yields of this invention. Thus, it is important to maintain intimate contact of dilute, aqueous reactants in correct ratios at the correct pH for a sufficient but not excessive time at a temperature which permits the desired reaction to occur in a relatively short time. There should be no undesirable excess of any of the reactants, as such excess leads to the formation of undesirable by-products by reactions between the reactants per se and between the reactants and reaction intermediates. The use of the mentioned reaction conditions gives the desired 129° C. melting isomer but little or none of the 86° C. melting isomer referred to in the cited prior art.

The low yields obtained in the prior art are considered to be due at least in part to the formation of the undesired 86° C. melting isomer, the use of incorrect reactant ratios and concentrated reactant solutions, and the loss of already formed product through hydrolysis resulting from long reaction times. Low yields can also result from the pre-mixing of (a) ammonium hydroxide and hydrogen cyanide; or of (b) the ammonium salt and formaldehyde, the latter being as advocated in prior art references. While runs made according to the continuous method of this invention can be continued indefinitely, it has been noted that, when the concentration of the charged reactants is greater than 30% by weight, plugging of the system is caused by the formation of a tarry product, which is apparently related to the plastic products referred to in some of the prior art references.

As is mentioned by Johnson and Rinehart, J.A.C.S. 46, 768 (1924), it appears that the product of the reaction utilized in this invention is a cyclic trimer. However, for simplicity, the monomeric nomenclature, viz., N-methyleneglycinonitrile, is used throughout the description of this invention and in the appended claims.

The following is a description of the utilization of the equipment depicted in the figure for the purposes of this invention:

Start-up (1) The heat exchanger (shell and tube, 22 1″ O.D. stainless steel tubes) 12, recirculation loop (3″ stainless steel piping) and 75 gal. glass-lined agitated reactor 36 were filled with water.

(2) The circulating pump (Dean Bros. stainless steel—385 g.p.m.) 13 was started.

(3) The $CH_2O$ solution was fed by a Lapp Pulsafeeder 29 through a rotameter 30 into the circulating system at the rate of 116 lbs./hr.

(4) After 5 minutes, the $NH_4OH$ solution was started through a Lapp Pulsafeeder 25 and rotameter 26 at the rate of 85.6 lbs./hr.

(5) The automatic pH valve 32 was then opened and the controller 33 was set at 6. H₂SO₄ was then charged to the recirculation loop automatically, as needed, from tank 40.

(6) The automatic valve 34 for the introduction of cooling water to heat exchanger 12 was then opened and the controller 35 for this valve was set at 30° C.

(7) The HCN solution was then started through a Lapp Pulsafeeder 21 and rotameter 22 at the rate of 67.4 lbs./hr.

The results of additional runs in similar equipment are presented in the accompanying table. High yields of the desired N-methyleneglycinonitrile were obtained in Runs 3–10, inclusive, which were conducted under the reported varying conditions within the scope of this invention. Runs 11 and 12 show the low yields obtained when using reaction zone residence times below the prescribed minimum (about 60 minutes). Run 13 demonstrates the poor yield achieved when operating at a pH below about 5.0.

TABLE

| Run No. | Temp., ° C. | Feed rate lbs./hr. into 90 gal. system | pH | Solution concentrations, percent | | | Lbs. of H₂SO₄ (93%) | Residence time, mins. | Lbs. of— | | | Mole ratio HCN/CH₂O/NH₄OH | Percent yield of theoretical based on HCN charge |
|---|---|---|---|---|---|---|---|---|---|---|---|---|---|
| | | | | HCN | NH₄OH | CH₂O | | | HCN Soln. | CH₂O Soln. | NH₄OH Soln. | | |
| 3 | 30 | 94 | 5 | 9.6 | 10.87 | 13.9 | 28 | 60 | 354 | 928 | 669 | 1/3.44/1.51 | 90.0 |
| 4 | 35 | 106 | 5.5 | 14.3 | 17.6 | 18.1 | 20 | 60 | 387 | 828 | 563 | 1/2.44/1.38 | 88 |
| 5 | 35 | 106 | 5.5 | 14.0 | 18.2 | 17.7 | 23 | 60 | 406 | 1008 | 633 | 1/3.03/1.56 | 90.4 |
| 6 | 30 | 118 | 6 | 18.0 | 19.6 | 21.5 | 51 | 75 | 346 | 838 | 643 | 1/2.61/1.57 | 91.7 |
| 7 | 35 | 82 | 5.5 | 15.1 | 19.1 | 17.1 | 68 | 75 | 358 | 804 | 599 | 1/2.29/1.63 | 92.0 |
| 8 | 40 | 94 | 6 | 18.1 | 18.6 | 19.2 | 33 | 90 | 323 | 784 | 602 | 1/2.33/1.72 | 88.5 |
| 9 | 30 | 94 | 6 | 15.9 | 18.2 | 17.9 | 81 | 90 | 347 | 769 | 603 | 1/1.97/1.33 | 90.6 |
| 10 | 35 | 106 | 5.5 | 15.9 | 22.0 | 23.1 | 34 | 105 | 271 | 626 | 481 | 1/3.00/1.89 | 92.0 |
| 11 | 35 | 106 | 5.5 | 7.1 | 8.1 | 10.16 | 29 | 30 | 620 | 1300 | 916 | 1/2.72/1.30 | 63.3 |
| 12 | 40 | 118 | 6 | 10.7 | 11.5 | 14.0 | 13 | 45 | 500 | 1139 | 876 | 1/2.69/1.45 | 64.5 |
| 13 | 35 | 106 | 4.5 | 14.6 | 19.4 | 18.6 | 61 | 60 | 390 | 915 | 607 | 1/2.69/1.59 | 59.8 |

(8) The reactants were circulated through the heat exchanger 12 and continuously overflowed into the second reactor 36 at a rate equal to the total feed rates.

(9) The slurry was constantly drawn off from the second reactor 36 by a Randolph pump 37 and sent to a Dorr-Oliver horizontal rotary filter 39. Here, the product was filtered, washed and discharged to drum storage.

After two hours of steady operation (pH of 6, temp. 30° C. and indicated feed rates constant), a five hour yield check was begun. The total amounts of solutions used and product made were accurately recorded.

*Run #1 (5 hours)*

CH₂O: 582 lbs. of 22.7% soln.—4.3 moles
NH₄OH: 428 lbs. of 21.8% soln.—2.66 moles
HCN: 337 lbs. of 16.4% soln.—2.05 moles
H₂SO₄: 48 lbs. of 93% soln.
Mole ratio: 1 mole HCN:1.3 moles NH₄OH:2.1 moles CH₂O
Residence times (approx.): 30 mins. (first stage); 65 mins. (second stage)
Yield of desired product melting at 129° C.: 132 lbs. (dry); or 95% (of theoretical), based on HCN charged

*Run #2 (6 hours) (made similarly to Run #1)*

CH₂O: 828 lbs. of 19.5% soln.—5.38 moles
NH₄OH: 611 lbs. of 18.9% soln.—3.3 moles
HCN: 362 lbs. of 15.4% soln.—2.06 moles
H₂SO₄: 30 lbs. of 93% soln.
Mole ratio: 1 mole HCN:1.6 mole NH₄OH:2.61 moles CH₂O
Residence times: same as for Run #1
Yield of desired product melting at 129° C.: 134 lbs. (dry); or 95.5% (of theoretical), based on HCN charged.

Details of the technique used in the experimental design are presented in the following publications:

"The Exploration and Exploitation of Response Surfaces: Some General Considerations and Examples" by G. E. P. Box, Biometrics, March 1954; "On the Experimental Attainment of Optimum Conditions" by G. E. P. Box and K. B. Wilson, Journal of the Royal Statistical Society, Series B (Methodological), Vol. XIII, No. 1, 1951; and "Multi-Factor Experimental Designs for Exploring Response Surfaces" by G. E. P. Box and J. S. Hunter, The Annals of Mathematical Statistics, Vol. 28, No. 1, March 1957.

The actual design utilized in determining the optimum conditions for conducting the process of this invention was a composite star, in which the following levels of values for the important variables were used:

| Variables | Levels | | | | |
|---|---|---|---|---|---|
| | −2 | −1 | 0 | +1 | +2 |
| Temp., ° C., $X_1$ | 25 | 30 | 35 | 40 | 45 |
| Concentration of reactants, $X_2$ | 7 | 11 | 15 | 19 | 23 |
| Feed rate of reactants, $X_3$ | 82 | 94 | 106 | 118 | 130 |
| pH, $X_4$ | 4.5 | 5 | 5.5 | 6 | 6.5 |

The above selection of values for the variables in developing the star design was based on prior experimental work, which gave indications as to appropriate levels to be tested further.

The data from the composite star design were put through a least squares multiple regression analysis in order to obtain the estimates for the regression coefficients in the following polynomial. This technique is illustrated in the Box-Hunter reference above on pp. 234–237. In this equation, Y is the yield, based on conversion of HCN.

$$Y = 85.620 - 2.175X_1 + 6.758X_2 - 3.392X_3 - .492X_4$$
$$- .138X_1X_2 + 2.450X_1X_3 - 2.350X_1X_4$$
$$+ 1.988X_2X_3 + 4.538X_2X_4$$
$$- .525X_3X_4$$
$$- 3.815X_1^2 - 1.453X_2^2 - .190X_3^2 - 6.565X_4^2$$

The equation can be solved for a maximum yield by taking the partial derivatives of Y with respect to $X_1$, $X_2$, $X_3$ and $X_4$.

$$\frac{\delta Y}{\delta X_1} = -2.175 - .138X_2 + 2.45X_3 - 2.35X_4 - 7.63X_1$$

$$\frac{\delta Y}{\delta X_2} = 6.758 - .138X_1 + 1.988X_3 + 4.538X_4 - 2.906X_2$$

$$\frac{\delta Y}{\delta X_3} = -3.392 + 2.45X_1 + 1.988X_2 - .525X_4 - .38X_3$$

$$\frac{\delta Y}{\delta X_4} = -4.92 - 2.35X_1 + 4.538X_2 - .525X_3 - 13.13X_4$$

Setting these equations equal to zero and solving simultaneously gives the values of the several variables for the maximum yield (100% of theoretical).

$$-7.63X_1 - .138X_2 + 2.45X_3 - 2.35X_4 = 2.175$$
$$-.138X_1 - 2.906X_2 + 1.988X_3 + 4.538X_4 = -6.758$$
$$2.45X_1 + 1.988X_2 - .38X_3 - .525X_4 = 3.392$$
$$-2.35X_1 + 4.538X_2 - .575X_3 - 13.13X_4 = 4.92$$

Solving simultaneously produces the optimum values of the variables:

$$X_1 = -.974 \text{ (or } 30.13° \text{ C.)}$$
$$X_2 = 2.907 \text{ (or } 26.63\%)$$
$$X_3 = -1.158 \text{ (or } 97.9 \text{ lbs./hr.)}$$
$$X_4 = .850 \text{ (or a pH of } 5.925)$$

It is of interest that all of these calculated optimum values are within the range of the experimental conditions used in obtaining the data presented above, except in the case of the reactant solution concentration ($X_2$). The latter optimum value is several percent higher than the values used in any of the experimental runs, but is indicative of how yields superior to those reported above can be obtained.

The foregoing description presents information on a continuous method of producing N-methyleneglycinonitrile in improved yields and in accordance with a simplified method of operation. The N-methyleneglycinonitrile has utility, following its reaction with, e.g., resorcinol, in adhering textile materials to rubber (as reported and claimed in U.S. Patent No. 3,018,207).

Having thus described our invention, what we claim and desire to protect by Letters Patent is:

1. A continuous method for the production of N-methyleneglycinonitrile which comprises: (a) continuously introducing reactants consisting of hydrogen cyanide, ammonia and formaldehyde in a molar ratio of 1 HCN/from about 1 to about 2 $NH_3$/from about 1.8 to about 3.5 $CH_2O$ into a reaction zone to form an aqueous reaction mass, the combined charge to the reaction zone containing from about 70 to about 85% by weight of water, said reaction mass being maintained at a temperature in the range from about 10° to about 60° C. and the pH of said reaction mass being maintained at a level of not more than 7.0 through the addition thereto, as required, of an acid which does not react under the reaction conditions and which has a dissociation constant of at least $10^{-5}$; (b) mixing the reaction mass with good agitation as fresh feed stock is introduced thereinto; and (c) continuously withdrawing a portion of the reaction mass containing solid N-methyleneglycinonitrile from said reaction zone.

2. The method of claim 1, in which the production of N-methyleneglycinonitrile is effected in a minimum of two stages, the first of said stages being conducted in a recycle loop with agitation and cooling means and the other of said stages being conducted in a reactor equipped to provide mechanical agitation.

3. The method of claim 1, in which said reaction zone temperature is maintained in the range from about 25° to about 45° C.

4. The method of claim 1, in which said pH is maintained in the range from about 5.0 to about 6.8.

5. The method of claim 1, in which said pH is maintained through the addition of sulfuric acid, as required, to said reaction mass.

6. The method of claim 1, in which the withdrawal of reaction mass from said reaction zone is at substantially the same rate as that at which the reactants are charged thereinto.

7. The method of claim 1, in which said solid N-methyleneglycinonitrile is separated from the reaction zone effluent by filtration and the separated solids are washed with water and dried.

8. The method of claim 1, in which the average residence time in said reaction zone is from about 60 to about 150 minutes.

References Cited by the Examiner

UNITED STATES PATENTS 3,167,581    1/1965    Saunders et al. ____ 260—465.5

CHARLES B. PARKER, *Primary Examiner.*

JOSEPH P. BRUST, *Assistant Examiner.*